No. 859,077. PATENTED JULY 2, 1907.
E. KEMPSHALL.
METHOD OF MAKING TIRES.
APPLICATION FILED MAY 18, 1906. RENEWED MAY 9, 1907.
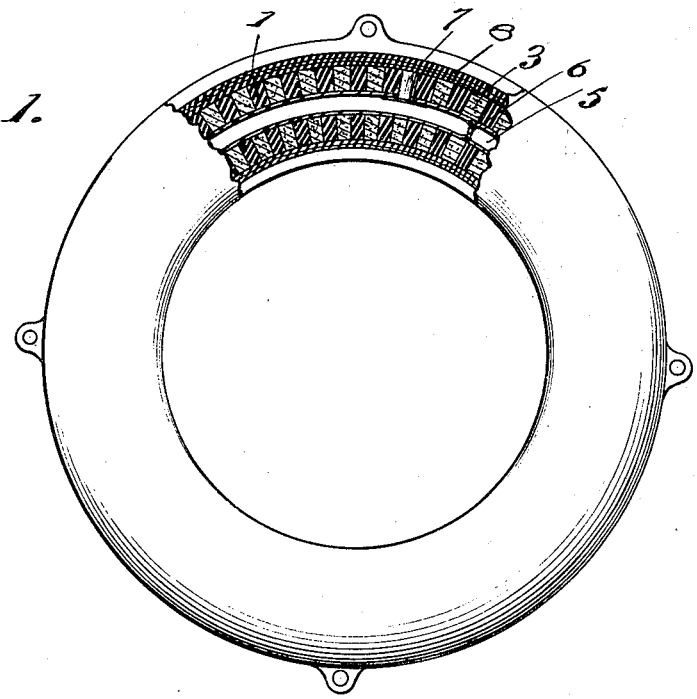
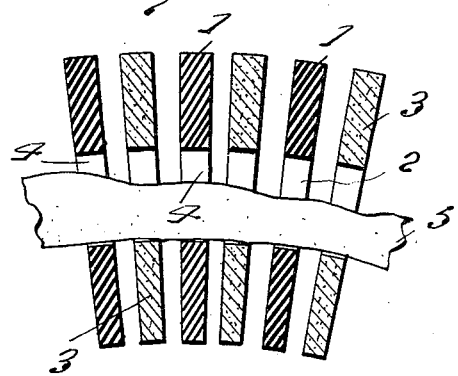
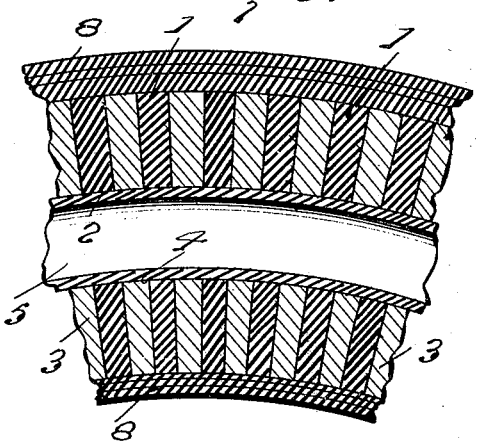
Witnesses
F. B. Williams
Floyd R. Cornwall
Inventor
E. Kempshall
By J. M. Muir
Attorney

UNITED STATES PATENT OFFICE.

ELEAZER KEMPSHALL, OF BOSTON, MASSACHUSETTS, ASSIGNOR TO KEMPSHALL TIRE COMPANY, OF BOSTON, MASSACHUSETTS, A CORPORATION OF MAINE.

METHOD OF MAKING TIRES.

No. 859,077.  Specification of Letters Patent.  Patented July 2, 1907.

Application filed May 18, 1906. Renewed May 9, 1907. Serial No. 372,765.

*To all whom it may concern:*

Be it known that ELEAZER KEMPSHALL, a citizen of the United States, residing at Boston, in the county of Suffolk and State of Massachusetts, has invented certain new and useful Improvements in Methods of Making Tires, of which the following is a specification.

This invention relates to an improved method of making vehicle tires.

In carrying out the process, the prime features include a tire made up of sections of materials of varying degrees of resiliency and resistance to wear, and vulcanize a cover thereto to form practically a homogeneous tire structure.

The sections forming the tire construction are first assembled, or strung on a deflated tube, which is afterwards inflated to exert pressure toward the circumference of the sections, as against the inward pressure exerted by the mold when vulcanizing the tire. This feature of my method is quite essential in the manufacture of tires made up of sections and vulcanized to a resilient cover to form an integral whole. The outward pressure exerted by the inflated tube, supports the sections when the mold pressure and heat is applied resulting in the thorough and absolute vulcanizing of the tire as a whole.

In the drawings—Figure 1 is a view of a tire incased in a vulcanizing mold. Fig. 2 is a view of a portion of a tire showing the sections strung on a deflated tire. Fig. 3 is a similar view, the tire being inflated, and the cover applied ready for the vulcanizing process.

In carrying out my improved method I arrange a series of transverse resilient sections, and sections of less resilient material. The resilient sections are composed of rubber, while the less resilient sections may be leather, or gutta-percha, preferably the latter. The resilient sections are indicated at 1, and are formed with openings 2. The non-resilient sections 3, are similar in size and shape to the sections 1, and are also formed with openings 4. A deflated tube 5, is passed through the openings 2 and 4, to longitudinally string the sections and when a sufficient number of sections have been assembled the ends of the tube are tied, as at 6, the valve 7, being embedded between the sections. After the tube is tied, it is inflated by connecting a source of air supply to the valve, and the sections, by reason of their shape assume tire form, the now inflated tube exerting pressure outwardly toward the tire circumference to support and resist the inward pressure of the mold. After the sections have been assembled, and the tube has been inflated, a cover 8, is applied. This cover may be applied in any well known manner and is composed of rubber and fabric.

The tire in its present form consists of a series of sections of resilient vulcanizable material and sections of non-resilient material with an embedded inflated vulcanized resilient tube, and an unvulcanized cover. This incomplete tire is now transferred to a vulcanizing mold, and is subjected to the usual vulcanizing process, the inflated tube resisting the pressure of the mold and heat, as previously stated.

When gutta-percha is employed as the non-resilient agent, it fuses with the adjacent resilient sections and the cover and forms a substantial vulcanized homogeneous mass surrounding an inflated tube. But when leather is used as the non-resilient agent, of course the resilient sections and the cover are the only elements which unite.

The pressure of the inflated tube prevents the vulcanizable material yielding, which avoids the usual soft interior. The soft interior is successfully overcome by my improved method as the pressure exerted in opposite direction holds the particles of material together which allows the heat to penetrate to successfully treat the entire body.

After the vulcanizing process is over the mold is removed, and a substantial and durable tire is produced. The inflated tube remains in the tire, and the valve is embedded, so that the air will remain within the structure and act as a pneumatic feature.

What I claim is—

1. The herein described process of constructing tires, consisting in assembling in tire form a series of sections of vulcanizable material and sections of non-resilient material, stringing said sections on a deflated flexible tube and then inflating the tube and vulcanizing the whole.

2. The herein described process of constructing tires, consisting in assembling a series of sections of vulcanizable and non-resilient sections of material on a deflated tube then inflating said tube and then inclosing the sections in a cover and vulcanizing the whole.

3. The herein described process of constructing tires, consisting in assembling in tire form a series of sections of rubber and gutta-percha arranged transverse the length of the tire on a deflated tube, then inflating the tube, and then inclosing the sections in a cover, and vulcanizing the whole.

4. The herein described process of constructing tires, consisting in assembling sections of resilient and non-resilient material provided with openings, and passing a flexible deflated tube through the openings and inflating the flexible tube after the sections have been assembled, enveloping the sections in a cover composed of rubber and strengthening material, and vulcanizing the whole.

5. The herein described process of constructing tires, consisting in assembling and alternately disposing in tire form rubber and gutta-percha, and vulcanizing the whole, to cause the gutta-percha and rubber to be fused together.

6. The herein described process of constructing tires, consisting in assembling and alternately disposing in tire form resilient and non-resilient sections of material formed with openings, stringing the sections on a deflated tube, and inflating the tube, and vulcanizing the whole.

7. The herein described process of constructing tires, consisting in assembling in tire form on an inflated resilient tube a series of sections of material, a part of said sections being of vulcanizable resilient material, inclosing the assembled sections in a vulcanizable resilient cover and vulcanizing the whole.

8. The herein described process of constructing tires, consisting of assembling in tire form on an inflated vulcanized tube, a plurality of sections of vulcanizable resilient sections and gutta-percha, and then subjecting the assembled sections to a vulcanizing process to fuse the sections together.

9. The herein described process of constructing tires, consisting in assembling a series of sections on a deflated tube, a part of the sections being of vulcanizable material, uniting the ends of the tube and inflating it, applying a cover to the sections composed of vulcanizable material and fabric, and vulcanizing the cover to the resilient sections.

10. The herein described process of constructing tires, consisting in embedding an inflated tube in a tire form composed of sections of vulcanizable resilient material and non-resilient material, applying a resilient cover to the sections and vulcanizing the whole while the tube is inflated.

11. The herein described process of constructing tires, consisting in assembling sections of resilient and non-resilient material in tire form, exerting pressure from the interior of the sections toward the outer sides thereof, applying a resilient cover to the sections, and vulcanizing the whole while the interior pressure is being exerted.

In testimony whereof I have signed my name to this specification in the presence of two subscribing witnesses.

ELEAZER KEMPSHALL.

Witnesses:
CHAS. E. WESTERVELT,
F. L. McKENNA.